(12) United States Patent
Mukainakano et al.

(10) Patent No.: US 9,908,562 B2
(45) Date of Patent: Mar. 6, 2018

(54) IMPACT ENERGY ABSORPTION STRUCTURE FOR VEHICLE

(71) Applicant: FUJI JUKOGYO KABUSHIKI KAISHA, Tokyo (JP)

(72) Inventors: Yuya Mukainakano, Tokyo (JP); Hiroshi Shimoyama, Tokyo (JP); Junya Iino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/206,644

(22) Filed: Jul. 11, 2016

(65) Prior Publication Data

US 2017/0015357 A1      Jan. 19, 2017

(30) Foreign Application Priority Data

Jul. 13, 2015      (JP) ................................. 2015-139506

(51) Int. Cl.
| | | |
|---|---|---|
| *B60N 99/00* | (2006.01) | |
| *B62D 25/04* | (2006.01) | |
| *B62D 21/15* | (2006.01) | |
| *B62D 29/00* | (2006.01) | |

(52) U.S. Cl.
CPC .......... *B62D 25/04* (2013.01); *B62D 21/157* (2013.01); *B62D 29/005* (2013.01)

(58) Field of Classification Search
CPC ..... B62D 25/04; B62D 21/157; B62D 29/005
See application file for complete search history.

(56) References Cited

U.S. PATENT DOCUMENTS

| | | | |
|---|---|---|---|
| 8,857,899 B2 | 10/2014 | Matsuda et al. | |
| 2001/0020794 A1 | 9/2001 | Ishikawa | |
| 2003/0189343 A1* | 10/2003 | Evans ..................... | B60R 19/18 293/120 |

(Continued)

FOREIGN PATENT DOCUMENTS

| | | |
|---|---|---|
| JP | 09-066799 | 3/1997 |
| JP | 2001-191947 A | 7/2001 |

(Continued)

OTHER PUBLICATIONS

Japanese Office Action dated Nov. 22, 2016, in Patent Application No. 2015-139506 (5 pages—Japanese with English machine translation).

(Continued)

*Primary Examiner* — Lori L Lyjak
(74) *Attorney, Agent, or Firm* — Smith, Gambrell & Russell, LLP

(57) ABSTRACT

An impact energy absorption structure for a vehicle has a structure in which an impact absorption member is disposed between an outer panel and inner panel. The impact absorption member is formed of ribs in a grid pattern. Specifically, first ribs each having a major surface facing in a front-rear direction are disposed approximately at regular intervals in the front-rear direction. In addition, second ribs each having a major surface facing in a vertical direction are disposed approximately at regular intervals in the vertical direction. The first ribs disposed at ends in the front-rear direction are closer to the outer panel than the first ribs disposed at a middle portion in the front-rear direction.

8 Claims, 5 Drawing Sheets

(56) References Cited

U.S. PATENT DOCUMENTS

2006/0145490 A1* 7/2006 Yamaguchi ............. B60R 19/18
    293/109
2014/0203592 A1* 7/2014 Nagwanshi .......... B62D 29/004
    296/187.01

FOREIGN PATENT DOCUMENTS

| JP | 2012-066649 A | 4/2012 |
| JP | 2013-212730 | 10/2013 |
| WO | 2004/020256 A1 | 3/2004 |

OTHER PUBLICATIONS

Japanese Office Action dated Feb. 14, 2007, in Patent Application No. 2015-139506 (7 pages—Japanese with English machine translation).

* cited by examiner

IMPACT ENERGY ABSORPTION STRUCTURE FOR VEHICLE

CROSS-REFERENCE TO RELATED APPLICATIONS

The present application claims priority from Japanese Patent Application No. 2015-139506 filed on Jul. 13, 2015, the entire contents of which are hereby incorporated by reference.

BACKGROUND

1. Technical Field

The present disclosure relates to an impact energy absorption structure for a vehicle, particularly to an impact energy absorption structure for a vehicle, that houses an impact absorption member formed of a resin inside a hollow closed-section body such as a center pillar.

2. Related Art

In a typical vehicle, a hollow closed-section body is formed by a joint structure that joins an outer panel and an inner panel made of a steel plate, and the structure constitutes the main framework of the vehicle. For the joint structure, sufficient strength is needed in order to secure the safety of occupants when an impact is applied to the structure in a collision accident or the like. In order to satisfy the need, for instance, a reinforcement member may be disposed in the space between the outer panel and the inner panel.

Referring to Japanese Unexamined Patent Application Publication (JP-A) No. 2013-212730, it is described therein that a reinforcement member containing of a resin is disposed between an outer panel and an inner panel. Referring to FIG. 4, an outer panel 104 and an inner panel 102 are joined together to form a center pillar 100, in the closed-section space of which a reinforcement 106 is disposed. Since the reinforcement 106 is included in the center pillar 100, an impact energy at the time of a collision is absorbed by deformation of the reinforcement 106, and thus the safety at the time of a collision is improved.

Also, the reinforcement 106 is formed in a grid pattern by ribs 108 extending in a widthwise direction on the paper surface and ribs 110 extending in a lengthwise direction on the paper surface. This achieves the effect that strength and stiffness are appropriately designed and the safety at the time of a collision is improved.

However, in the invention described in JP-A No. 2013-212730, referring to FIG. 4, the reinforcement 106 housed between the outer panel 104 and the inner panel 102 has an uniform thickness in a vehicle width direction. Thus, there has been a problem in that when an impact energy is applied to the reinforcement 106 at the time of a collision accident, the reinforcement 106 is crushed overall in a relatively short time and the impact energy is not sufficiently absorbed.

SUMMARY OF THE INVENTION

The present disclosure has been made in consideration of such a problem, and it is desirable to provide an impact energy absorption structure for a vehicle that is capable of absorbing an impact energy favorably when a side collision occurs.

The impact energy absorption structure for a vehicle of the present disclosure includes: an outer panel; an inner panel; and an impact absorption member that is disposed in a hollow closed-section body formed by the outer panel and the inner panel, and that absorbs an impact energy when a collision occurs. In the impact absorption member, first ribs disposed in a front-rear direction and second ribs disposed in a vertical direction are formed in a grid pattern, and the first ribs disposed at ends in the front-rear direction are closer to the outer panel than the first ribs disposed at a middle portion in the front-rear direction.

The first ribs disposed at the ends in the front-rear direction may be thicker than the first ribs disposed at the middle portion in the front-rear direction.

A central portion of the first ribs in the vertical direction may project closer to the outer panel than end portions of the first ribs in the vertical direction.

The second ribs disposed near a center in the vertical direction may be thicker than the second ribs disposed at ends in the vertical direction.

The impact absorption member may contain carbon fiber reinforced plastic.

BRIEF DESCRIPTION OF THE DRAWINGS

FIG. 1A is a perspective view illustrating a vehicle having the impact energy absorption structure for a vehicle, and FIG. 1B is a perspective view illustrating a center pillar on an enlarged scale;

FIG. 2A is a perspective view illustrating an impact absorption member, and FIGS. 2B to 2D are sectional views of the impact absorption member;

FIG. 3A is a graph illustrating the impact absorption characteristics of a comparative example, and FIG. 3B is a graph illustrating the impact absorption characteristics in the present implementation.

DETAILED DESCRIPTION

Hereinafter, an impact energy absorption structure for a vehicle of the present implementation will be described with reference to the drawings. In the following, description is given using the directions of up, down, front, rear, right and left. A right-left direction indicates the right-left direction with respect to the direction of movement (forward direction) of a vehicle.

Figure 1A:
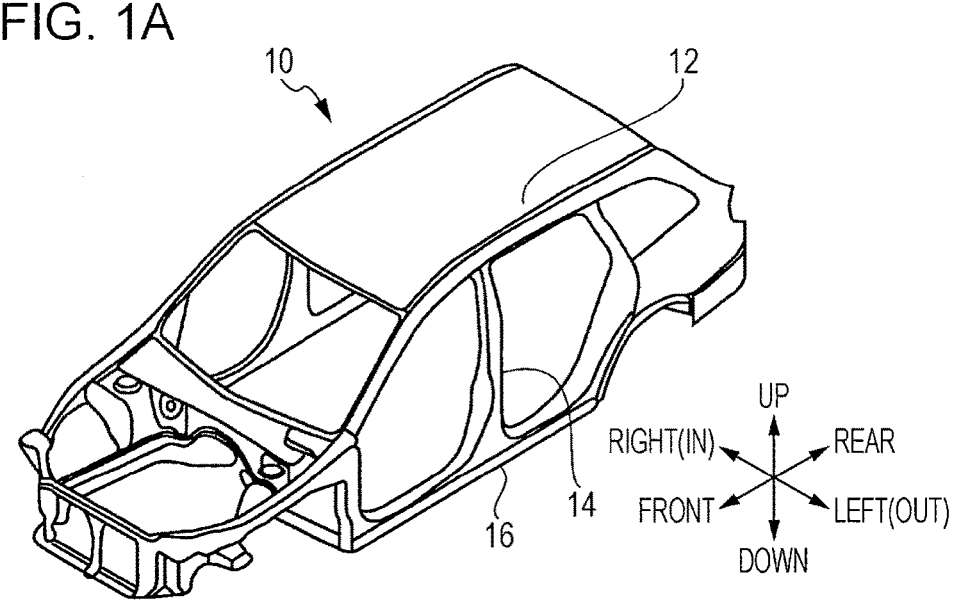
FIGS. 1A and 1B illustrate an impact energy absorption structure for a vehicle of the present disclosure.

A vehicle 10 having an impact energy absorption structure for a vehicle of the present implementation will be described with reference to FIGS. 1A and 1B. FIG. 1A is a perspective view illustrating the vehicle 10, and FIG. 1B is a perspective view illustrating, on an enlarged scale, a portion provided with an impact energy absorption structure 11 for a vehicle.

Referring to FIG. 1A, the vehicle body of the vehicle 10 is illustrated and the vehicle 10 includes a plurality of steel plates which are each pressed into a predetermined shape. At a lower portion of each of the right and left end sides of the vehicle 10, a side sill 16 is formed that extends in a front-rear direction. A center pillar 14 is formed that extends upward from a central portion of the side sill 16 which is disposed on the left illustrated in FIG. 1A. The upper end of the center pillar 14 is coupled to a roof 12.

Figure 1B:
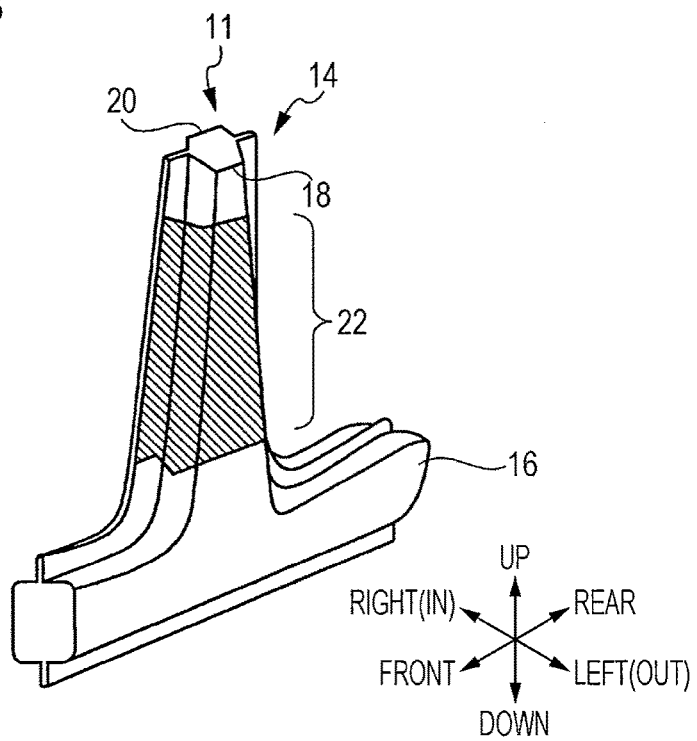

FIG. 1B illustrates the case where the impact energy absorption structure 11 for a vehicle of the present implementation is formed in the center pillar 14. In FIG. 1B, a housing region 22 in which the later-described impact absorption member is disposed is indicated by hatching. The impact energy absorption structure 11 for a vehicle of the present implementation is formed at a lower portion of the center pillar 14, and when a vehicle and other vehicle are involved in a side collision, an impact energy from the other vehicle is applied to the portion. In the following, a case will be described in which the impact energy absorption structure 11 for a vehicle is formed at a lower portion of the center pillar 14. However, it is also possible to form the impact energy absorption structure 11 for a vehicle of the present implementation in another pillar.

The impact energy absorption structure 11 for a vehicle of the present implementation has a structure in which an impact absorption member (not illustrated here) is disposed between an outer panel 18 and an inner panel 20. The function of the impact energy absorption structure 11 for a vehicle is that when other vehicle collides with the vehicle 10 from the left, the internally installed impact absorption member is deformed, and thereby an impact energy caused by the collision is efficiently absorbed. The impact by a side collision is reduced by the impact energy absorption structure 11 for a vehicle of the present implementation, and thus it is possible to improve the safety of the occupants of the vehicle 10.

The outer panel 18 and the inner panel 20 are each formed of a pressed steel plate, and flanges are joined by spot welding or the like at the ends of both panels in the front-rear direction. This joint structure forms a hollow closed-section body that houses the later-described impact absorption member between the outer panel 18 and the inner panel 20.

Figure 2A:
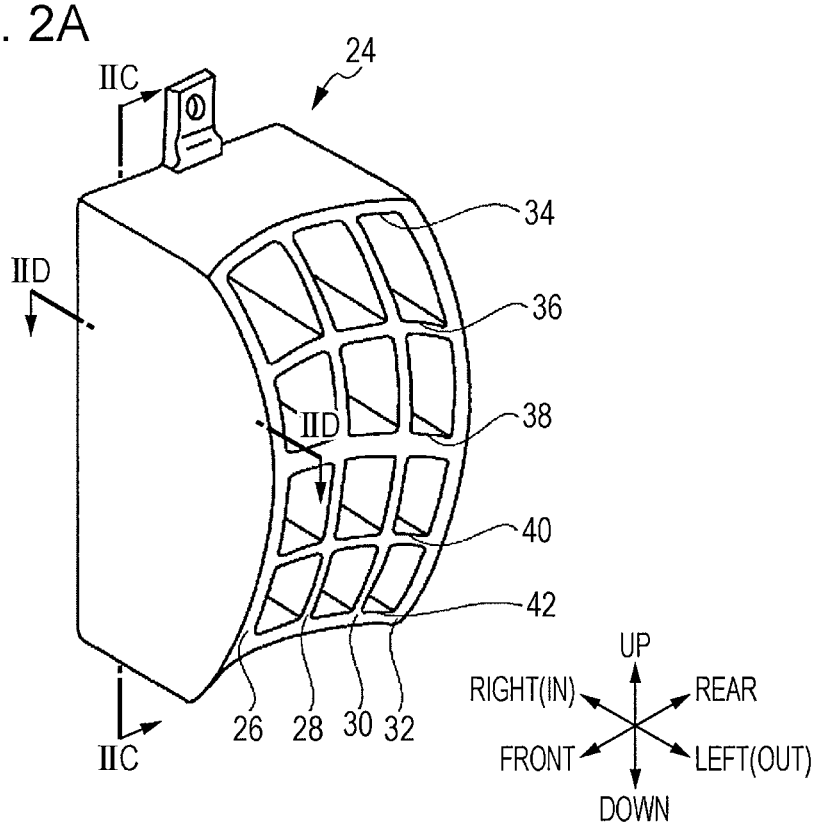
FIGS. 2A to 2D illustrate an impact energy absorption structure for a vehicle of the present disclosure.
Figure 2B:
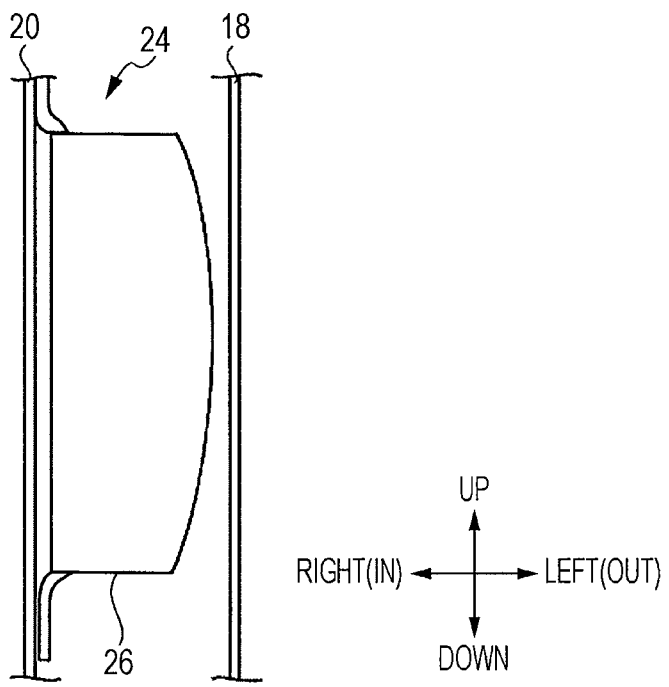
Figure 2C:
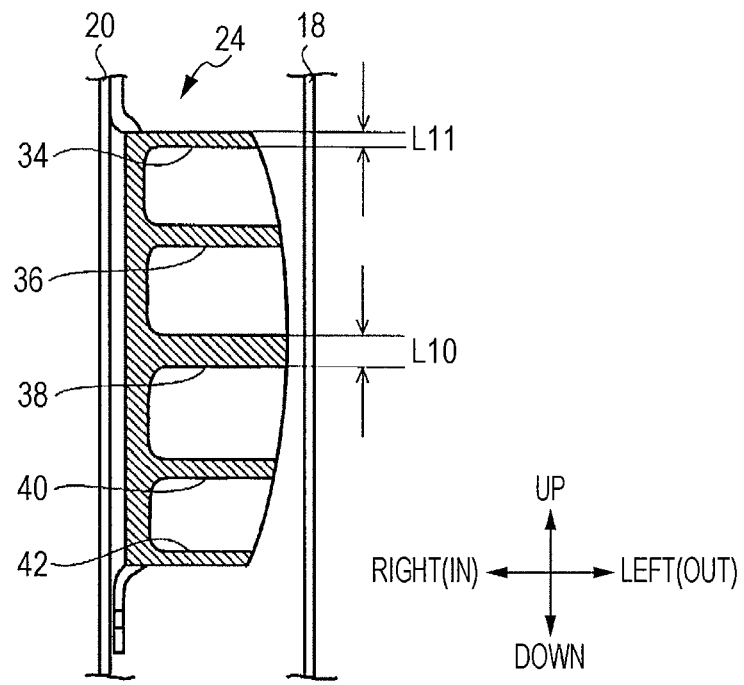
Figure 2D:
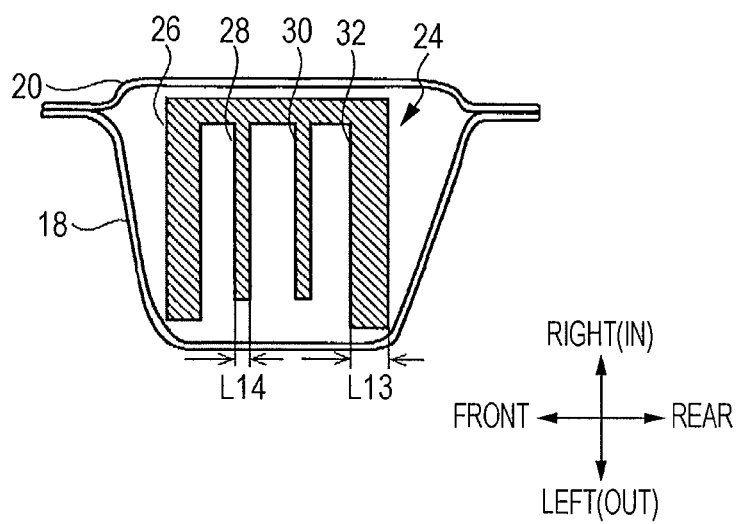

Referring to FIGS. 2A to 2D, the configuration of the impact absorption member 24 housed in the above-mentioned closed space will be described. FIG. 2A is a perspective view illustrating the impact absorption member 24 entirely, FIG. 2B is a side view of the impact absorption member 24 as seen from the front, FIG. 2C is a sectional view as seen along line IIC-IIC of FIG. 2A, and FIG. 2D is a sectional view as seen along line IID-IID of FIG. 2A.

Referring to FIG. 2A, the impact absorption member 24 contains a resin-based material which is integrally formed by an injection molding technique. Although any resin-based material may be used as the material the impact absorption member 24, particularly, carbon fiber reinforced plastic (hereinafter referred to as CFRP) is preferred as the material of the impact absorption member 24 because of its light weight and high mechanical strength. Specifically, since CFRP is a material having a light weight and high stiffness, the internally installed impact absorption member 24 using such a material enables to reduce the weight of the vehicle 10 and to improve the safety at the time of a collision.

The shape of the impact absorption member 24 is substantially a rectangular parallelepiped shape that has a longitudinal direction vertically. Also, each of the forward, rearward and rightward (inward) facing major surfaces of the impact absorption member 24 is a flat surface. On the other hand, the leftward (outward) facing major surface of the impact absorption member 24 has a variant shape different from the shape of a flat surface in order to improve the effect of impact absorption, and this matter will be described later. The impact absorption member 24 in this shape is fixed to the inner panel 20 at the upper and lower ends via a fastening unit such as a bolt.

Referring to FIG. 2A, the impact absorption member 24 is formed of a plurality of ribs in a grid pattern. Specifically, a plurality of first ribs 26, 28, 30, 32 each having a major surface facing in a front-rear direction is disposed approximately at regular intervals in the front-rear direction. In addition, a plurality of second ribs 34, 36, 38, 40, 42 each having a major surface facing in a vertical direction is disposed approximately at regular intervals in the vertical direction. Here, in order to simplify illustration, several number of the first ribs 26 and the second ribs 34 is illustrated. Practically, however, a large number of the first ribs 26 and the second ribs 34 may be formed.

In the present implementation, referring to FIG. 2D, in order to increase the impact energy absorbed by the impact absorption member 24 when a collision accident occurs, the first ribs 26, 32 disposed at the ends in the front-rear direction are closer to the outer panel 18 than the first ribs 28, 30 disposed near a central portion in the front-rear direction. Specifically, the outer ends of the first ribs 26, 32 disposed at the ends in the front-rear direction are placed closer to the outer panel 18 than the outer ends of the first ribs 28, 30 disposed near a central portion in the front-rear direction. This placement protects the impact absorption member 24 from being crushed in the right-left direction in an early stage of a collision, and it is possible to increase the impact energy absorbed by the impact absorption member 24. In addition, the outer panel 18 is protected from being deformed.

Specifically, when a collision accident occurs, the collision with the other vehicle first causes the outer panel 18 to be deformed inwardly. As described above, the outer panel 18 is formed of a thin steel plate, and thus the outer panel 18 is relatively easily deformed by an impact energy at the time of a collision accident. The impact absorption member 24 is then pressed by the inwardly deformed outer panel 18. In the present implementation, the outer panel 18 is deformed and comes into contact with the first ribs 26, 32, thereby achieving the effect of reducing subsequent deformation of the outer panel 18. On the other hand, in this stage, the outer panel 18 is not in contact with the first ribs 28, 30 disposed near the center in the front-rear direction. Therefore, in an early stage, although the first ribs 26, 32 are compressed and deformed in the right-left direction, the first ribs 28, 30 are not compressed and deformed.

Subsequently, when the outer panel 18 is deformed further inwardly, in addition to the first ribs 26, 32 at both ends, the first ribs 28, 30 near the center are also compressed and deformed. Therefore, the first ribs 28, 30 near the center are compressed and deformed after the first ribs 26, 32 at both ends are compressed and deformed. This enables the time period in which the impact is absorbed to be increased for the degree of distortion created in the impact absorption member 24.

Figure 3A:
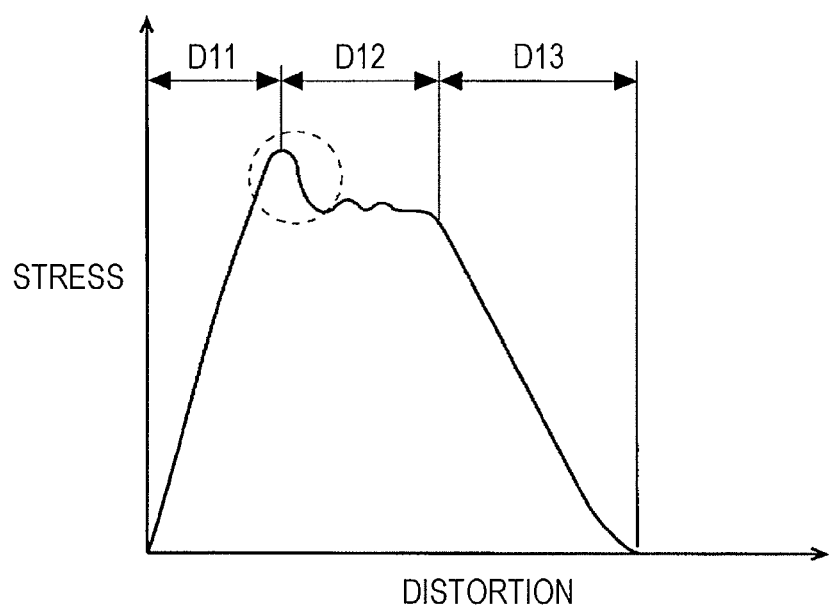
FIGS. 3A and 3B are graphs illustrating energy absorption characteristics of the energy absorption structure for a vehicle of the present disclosure.
Figure 3B:
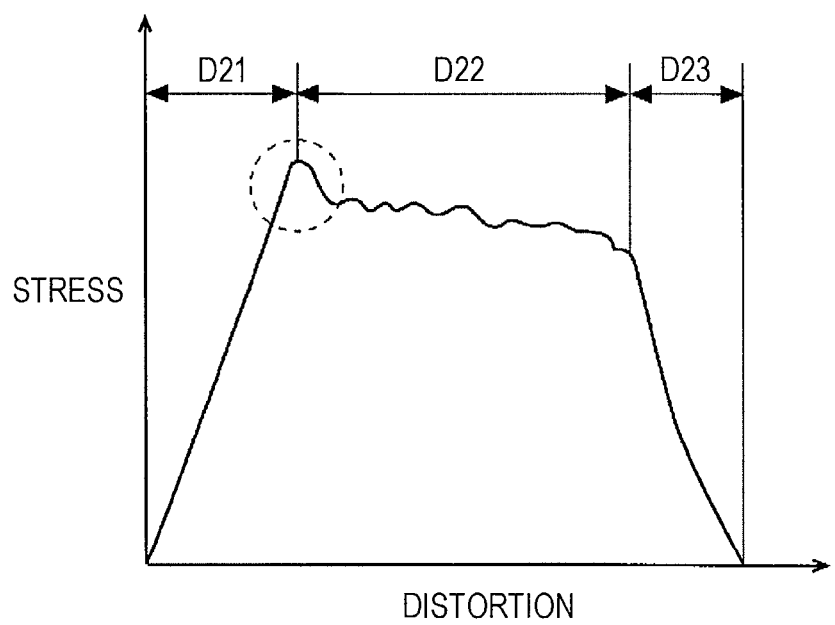
Figure 4:
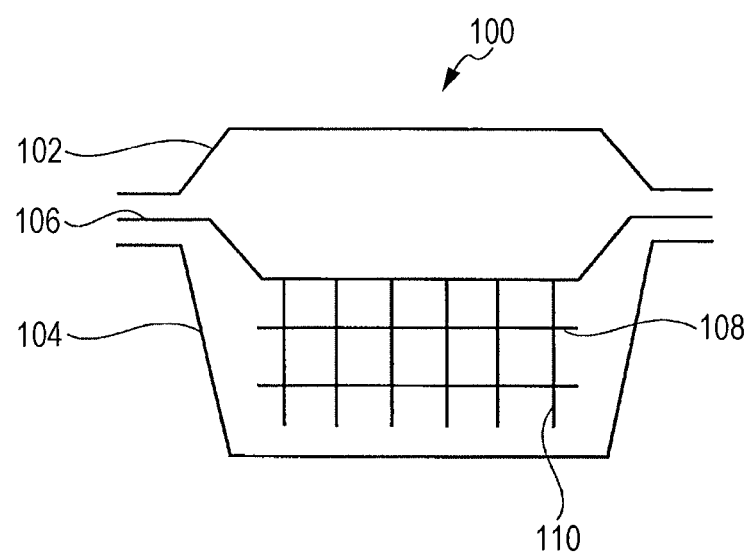
FIG. 4 is a sectional view illustrating the impact energy absorption structure for a vehicle according to the related art.

This matter will be described with reference to FIGS. 3A and 3B. Each graph of FIGS. 3A and 3B illustrates the relationship between the distortion and stress applied to the impact absorption member 24. The horizontal axis represents the distortion created in the impact absorption member 24, and the vertical axis represents the stress caused by the distortion. FIG. 3A illustrates the case where the lengths of the ribs illustrated in FIGS. 2A to 2D are made uniform, and FIG. 3B illustrates the case of the impact absorption member 24 in the present implementation illustrated in FIGS. 2A to 2D.

Referring to FIG. 3A, the time period in which an impact is applied to the impact absorption member may be roughly divided into a first time period D11 in which the stress increases proportionally to the degree of distortion, a second time period D12 in which a high stress is maintained over a certain time period, and a third time period D13 in which the stress decreases as the degree of distortion increases.

In the case of a comparative example, when an impact is applied, the impact absorption member is deformed overall as described above, and thus the second time period D12 with high stress is shortened. In other words, although the peak of stress is high compared with the present implementation, the impact absorption member is destroyed in a brittle manner. Therefore, the impact energy absorbed by the impact absorption member in the comparative example is small, and the safety at the time of a collision accident may be reduced. Also, because the peak of stress is high, an impact energy applied to an occupant may be large in an early stage of a collision accident, and the safety may be reduced.

Referring to FIG. 3B, similarly to FIG. 3A, the impact absorption member 24 of the present implementation has a first time period D21, a second time period D22, and a third time period D23. Although the peak of stress is low compared with the case illustrated in FIG. 3A, the time period D22 with a high stress maintained is ensured to be longer than the second time period D12 in the comparative example in a stable manner. Thus, more impact energy is absorbed by the impact absorption member 24, and eventually the strength the center pillar 14 against bending may be improved. This is because as illustrated in FIG. 2D, when a collision occurs, the first ribs 26, 32 at both ends in the front-rear direction are deformed, then the first ribs 28, 30 in a central portion in the front-rear direction start to be deformed, and thus on the whole, the time taken for each rib to be deformed may be ensured to be longer.

Referring to FIG. 2B, in the present implementation, a central portion of the first rib 26 in the vertical direction projects closer to the outer panel 18 than both ends of the first rib 26 in the vertical direction. Referring to FIG. 2B, the lateral face of the first rib 26 near the inner panel 20 presents a linear shape in order to come into close contact with the inner panel 20. On the other hand, in the lateral face of the first rib 26 near the outer panel 18, a central portion projects most nearly to the outer panel 18 and vertical both ends each present a curved face disposed closer to the inner panel 20 side. This configuration also applies to others first ribs 28, 30, 32 illustrated in FIG. 2A. With this configuration, when a collision accident occurs, the outer major surface of the impact absorption member 24 does not entirely come into contact with the outer panel 18, but only a central portion of the impact absorption member 24 comes into contact with the outer panel 18 and is deformed. As the outer panel 18 is moved inwardly, the first rib 26 is gradually deformed overall. Consequently, deformation gradually develops from the central portion, and thus it is possible to increase the time period in which the first rib 26 is deformed while generating stress. Therefore, the second time period D22 illustrated in FIG. 3B is increased, and thus it is possible to increase the impact energy absorbed by the impact absorption member 24.

Also, the central portion of the first rib 26, which projects most nearly to the outer panel 18, may be adjusted to be disposed at a position which is expected to receive an initial impact when a side collision occurs. In other words, the central portion of the first rib 26, which projects most nearly to the outer panel 18, is adjusted to have the same height as the height of the bumper of other vehicle which collides with a self-vehicle. Consequently, when a side collision accident between a vehicle occurs, the impact energy coming from other vehicle is absorbable by the impact absorption member 24 efficiently.

Referring to FIG. 2C, in the present implementation, the second ribs 34 and others are disposed in a vertical direction and the ribs disposed at the central portion in the vertical direction have a greater thickness than the ribs disposed at both ends. Specifically, thickness L10 of the second rib 38 disposed at the central portion in the vertical direction is greater than thickness L11 of the second rib 34 disposed at the upper end. Also, in the second rib 34 and others, the rib disposed at the central portion is closer to the outer panel 18 than the ribs disposed at both ends. Therefore, when a collision accident occurs, the second rib 38 at the central portion first comes into contact with the outer panel 18 and is pressed. After the second rib 38 at the central portion is deformed to some extent, the second ribs 36, 40 adjacent to the second rib 38 come into contact with the outer panel 18 and are deformed. Subsequently, the second ribs 34, 42 disposed at both ends in the vertical direction come into contact with the outer panel 18 and are deformed.

Since the thick second rib 38 has a relatively high stiffness due to what has been described above, it is possible to increase the peak of stress in the first time period D21 in an early stage where the impact absorption member 24 is deformed, and to avoid reduction of the stress. In short, referring to FIG. 3B, it is possible to avoid drop of the stress in an early stage of the second time period D22.

Furthermore in the present implementation, referring to FIG. 2D, thickness L13 of the first ribs 26, 32 disposed at both ends in the front-rear direction is greater than thickness L14 of the first ribs 28, 30 disposed at the central portion in the front-rear direction. Consequently, in an early stage at the time of a collision, it is possible to avoid drop of the stress.

Specifically, referring to FIG. 3A, when the thickness of the ribs of the impact absorption member is made uniform, drop of the stress is sharp in an early stage (the portion enclosed by a dotted line) of the second time period D12, and the impact energy absorbed by the impact absorption member is decreased. This is because the ribs are bent relatively easily in the early stage where the impact absorption member is deformed.

On the other hand, in the present disclosure illustrated in FIG. 3B, the drop of the stress in an early stage (the portion enclosed by a dotted line) of the second time period D22 is relatively small. This is because as described above with reference to FIG. 2D, the first ribs 26, 32 first deformed at the time of a collision are relatively thick, and thus when the thick first ribs 26, 32 are deformed, more stress is generated, and the stress which acts at the time of deformation is increased. This allows the impact absorption member 24 in the present implementation to absorb much more impact energy.

Although the implementation of the present disclosure has been described above, the present disclosure is not limited to the above-described implementation and may be modified as needed in a range without departing from the spirit of the present disclosure.

The invention claimed is:
1. An impact energy absorption structure for a vehicle, comprising:
   an outer panel formed of a pressed steel plate;
   an inner panel formed of a pressed steel plate; and
   an impact absorption member that is disposed in a hollow closed-section body formed by the outer panel and the inner panel, and that absorbs an impact energy when a side collision occurs, wherein in the impact absorption member, first ribs disposed in a front-rear direction and second ribs disposed in a vertical direction are formed in a grid pattern, first ribs disposed at ends of the impact absorption member in the front-rear direction are closer to the outer panel than the first ribs disposed at a middle portion of the impact absorption member in the front-rear direction, and a central portion of the first ribs in the vertical direction projects closer to the outer panel than end portions of the first ribs in the vertical direction.

2. The impact energy absorption structure for a vehicle according to claim 1, wherein the first ribs disposed at the ends of the impact absorption member in the front-rear direction are thicker than the first ribs disposed at the middle portion of the impact absorption member in the front-rear direction.

3. The impact energy absorption structure for a vehicle according to claim 1, wherein second ribs disposed near a center of the impact absorption member in the vertical direction are thicker than second ribs disposed at ends of the impact absorption member in the vertical direction.

4. The impact energy absorption structure for a vehicle according to claim 2, wherein second ribs disposed near a center of the impact absorption member in the vertical direction are thicker than second ribs disposed at ends of the impact absorption member in the vertical direction.

5. The impact energy absorption structure for a vehicle according to claim 1, wherein the impact absorption member contains carbon fiber reinforced plastic.

6. The impact energy absorption structure for a vehicle according to claim 2, wherein the impact absorption member contains carbon fiber reinforced plastic.

7. The impact energy absorption structure for a vehicle according to claim 3, wherein the impact absorption member contains carbon fiber reinforced plastic.

8. The impact energy absorption structure for a vehicle according to claim 4, wherein the impact absorption member contains carbon fiber reinforced plastic.

* * * * *